(12) United States Patent
Shekhar

(10) Patent No.: US 11,017,240 B2
(45) Date of Patent: May 25, 2021

(54) SYSTEM AND METHOD FOR IMAGE ANALYSIS BASED SECURITY SYSTEM

(71) Applicant: Vigilands Inc, San Jose, CA (US)

(72) Inventor: Madhu Shekhar, San Jose, CA (US)

(73) Assignee: Vigilands Inc, San Jose, CA (US)

( * ) Notice: Subject to any disclaimer, the term of this patent is extended or adjusted under 35 U.S.C. 154(b) by 86 days.

(21) Appl. No.: 16/281,083

(22) Filed: Feb. 20, 2019

(65) Prior Publication Data

US 2020/0265240 A1  Aug. 20, 2020

(51) Int. Cl.
*G06K 9/00* (2006.01)
*G06K 9/62* (2006.01)
*G08B 13/196* (2006.01)

(52) U.S. Cl.
CPC ....... *G06K 9/00771* (2013.01); *G06K 9/6202* (2013.01); *G08B 13/196* (2013.01)

(58) Field of Classification Search
CPC .......................... G06K 9/00771; G06K 9/6202
See application file for complete search history.

(56) References Cited

U.S. PATENT DOCUMENTS

2003/0161535 A1* 8/2003 Kohno ................. G06K 9/6203
   382/215
2018/0233010 A1* 8/2018 Modestine ....... G08B 13/19684
2019/0244498 A1* 8/2019 Dumas .................. H04W 4/023

* cited by examiner

*Primary Examiner* — Tuan H Nguyen
(74) *Attorney, Agent, or Firm* — Minisandram Law Firm; Raghunath S. Minisandram

(57) ABSTRACT

A system and method for determining an object is disclosed. A security appliance, with a processor and memory is provided. The security appliance is configured to receive image of an object captured by a security device. The security device located in a first location. The security device also receives image of another object captured by another security device. The another security device located in a second location. The image of the object is processed to generate a first plurality of attributes for the object. The image of the another object is processed to generate a second plurality of attributes for the another object. The first plurality of attributes for the object and the second plurality of attributes for the another object are compared and based on the comparison, determine that the object and the another object are the same.

24 Claims, 15 Drawing Sheets

| NEIGHBORHOOD | |
|---|---|
| 562 | Name |
| 564 | Geographic Boundaries |
| 566 | User List |
| 568 | Neighborhood Watch List |
| 570 | Familiar Objects List |

| | |
|---|---|
| 582 | OBJECT ID |
| 584 | OBJECT CLASSIFICATION |
| 586 | OBJECT IDENTIFICATION |
| 588 | TIMESTAMP |
| 590 | CAMERA TYPE |
| 592 | CAMERA LOCATION |
| 594 | OBJECT CHARACTERISTICS |
| 596 | LINKED CAMERAS |
| 598 | OBJECT HISTORY |

QUERY / ACTIVITIES

602 — User
- Create
- Read
- Update
- Delete

604 — Camera
- Create
- Read
- Update
- Delete

606 — Incidents
- Create
- Read
- Update
- Delete

608 — Chunks
- Create
- Read
- Update
- Delete
- Find Objects
- Find Specific Object

610 — Neighborhood
- Create
- Read
- Update
- Delete
- Find Incidents

612 — Business Logic Queries
- Find Neighbors
- Find Incidents
- Find Related Incidents
- Find Objects Related to Incidents
- Find Objects Entering Neighborhood
- Find Objects Exiting Neighborhood
- Find Objects within Neighborhood

| Query | Input | Output |
|---|---|---|
| Create User | User details (Name, Address, Email etc) | NA |
| Read User | User ID | User Details |
| Update User | User Details to be updated | NA |
| Delete User | User ID | NA |
| Create Camera | Camera details (Name, link, type) | NA |
| Delete Camera | Camera ID | NA |
| Create Incidents | Incident details (Title, date, time range, description, cameras) | NA |
| Read Incidents | Incident ID | Incident Details |
| Update Incidents | Status | NA |
| Create Chunks | Chunk path, timestamp, objectlist, processed path, CameraID | NA |
| Read Chunks | Timestamp, Camera ID | Chunk details |
| Delete Chunk | Timestamp | NA |
| Find Objects | Incident ID | Object List |
| Neighbourhood Find Incidents | User ID | Neighbour incidents |
| Find Neighbours | User ID | Neighbour details |
| Find Objects Related to Incidents | Incident ID | objectList |

616 — Query
618 — Input
620 — Output

FIGURE 6B

| OBJECT ID = 215142 | DATA |
|---|---|
| Camera C1 Address | 2155 Delta Road, San Jose |
| Time Stamp | 02 Feb 2019 9:00 PM |
| Camera C2 Address | 1200 Oldfield Way, San Jose |
| Time Stamp | NA |
| Camera C3 Address | 1520 Addison Park Ln, San Jose |
| Time Stamp | NA |
| Camera C4 Address | 1526 Addison Park Ln, San Jose |
| Time Stamp | NA |
| Camera C5 Address | 1122 Fowler Way |
| Time Stamp | NA |
| Camera C6 Address | 2100 Delta Road, San Jose |
| Time Stamp | 02 Feb 2019 8:59 PM |

FIGURE 8B

| OBJECT ID = 215143 | DATA |
|---|---|
| Camera C1 Address | 2155 Delta Road, San Jose |
| Time Stamp | 02 Feb 2019 11:02 PM |
| Camera C2 Address | 1200 Oldfield Way, San Jose |
| Time Stamp | 02 Feb 2019 11:03 PM |
| Camera C3 Address | 1520 Addison Park Ln, San Jose |
| Time Stamp | NA |
| Camera C4 Address | 1526 Addison Park Ln, San Jose |
| Time Stamp | NA |
| Camera C5 Address | 1122 Fowler Way |
| Time Stamp | 02 Feb 2019 11:05 PM |
| Camera C6 Address | 2100 Delta Road, San Jose |
| Time Stamp | NA |

SYSTEM AND METHOD FOR IMAGE ANALYSIS BASED SECURITY SYSTEM

RELATED APPLICATIONS

None

TECHNICAL FIELD

The present invention relates generally to detection of an object by a security system and, more particularly, generating attributes related to the detected object.

DESCRIPTION OF RELATED ART

In the present-day environment, video or image based security systems are used to capture images based on various triggers. In some implementations, captured images are stored in a data store for review and playback. In some implementations, captured images may be sent to a user in real time. In some implementations the event of capture may be reported to a user.

In some examples, multiple devices may be capturing images. However, images captured by multiple devices may not be reviewed as a whole to develop a story or attributes about the detected object.

As more and more image capturing devices are deployed in a neighborhood, there is a need to piece together information gathered by a plurality of the image capturing device to develop a story or attribute about a detected object of interest. It is with these needs in mind, this disclosure arises.

SUMMARY OF THE INVENTION

In one embodiment, a method for determining an object is disclosed. A security appliance with process and memory is provided. Image of an object is received by the security appliance, image of the object captured by a first security device located in a first location. Image of another object is received by the security appliance, image of the another object captured by a second security device located in a second location. Image of the object is processed by the security appliance to generate a first plurality of attributes for the object. Image of the another object is processed by the security appliance to generate a second plurality of attributes for the another object. The first plurality of attributes for the object is compared with the second plurality of attributes for the another object and determine that the object and the another object are same based on the comparison.

In yet another embodiment, a system to determine an object is disclosed. A security appliance with process and memory is provided. Image of an object is received by the security appliance, image of the object captured by a first security device located in a first location. Image of another object is received by the security appliance, image of the another object captured by a second security device located in a second location. Image of the object is processed by the security appliance to generate a first plurality of attributes for the object. Image of the another object is processed by the security appliance to generate a second plurality of attributes for the another object. The first plurality of attributes for the object is compared with the second plurality of attributes for the another object and determine that the object and the another object are same based on the comparison.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIGS. 5A and 5B show an example database schema, according to an example of this disclosure;

FIG. 5C shows an example object attribute table, according to an example of this disclosure;

FIGS. 6A and 6B shows example queries and activities supported by the security appliance, according to an example of this disclosure;

FIG. 8B shows an example object tracking table, for a plurality of security devices in the example neighborhood of FIG. 8A, according to an example of this disclosure;

FIG. 8C shows another example object tracking table, for a plurality of security devices in the example neighborhood of FIG. 8A, according to an example of this disclosure;

DETAILED DESCRIPTION

Figure 1:
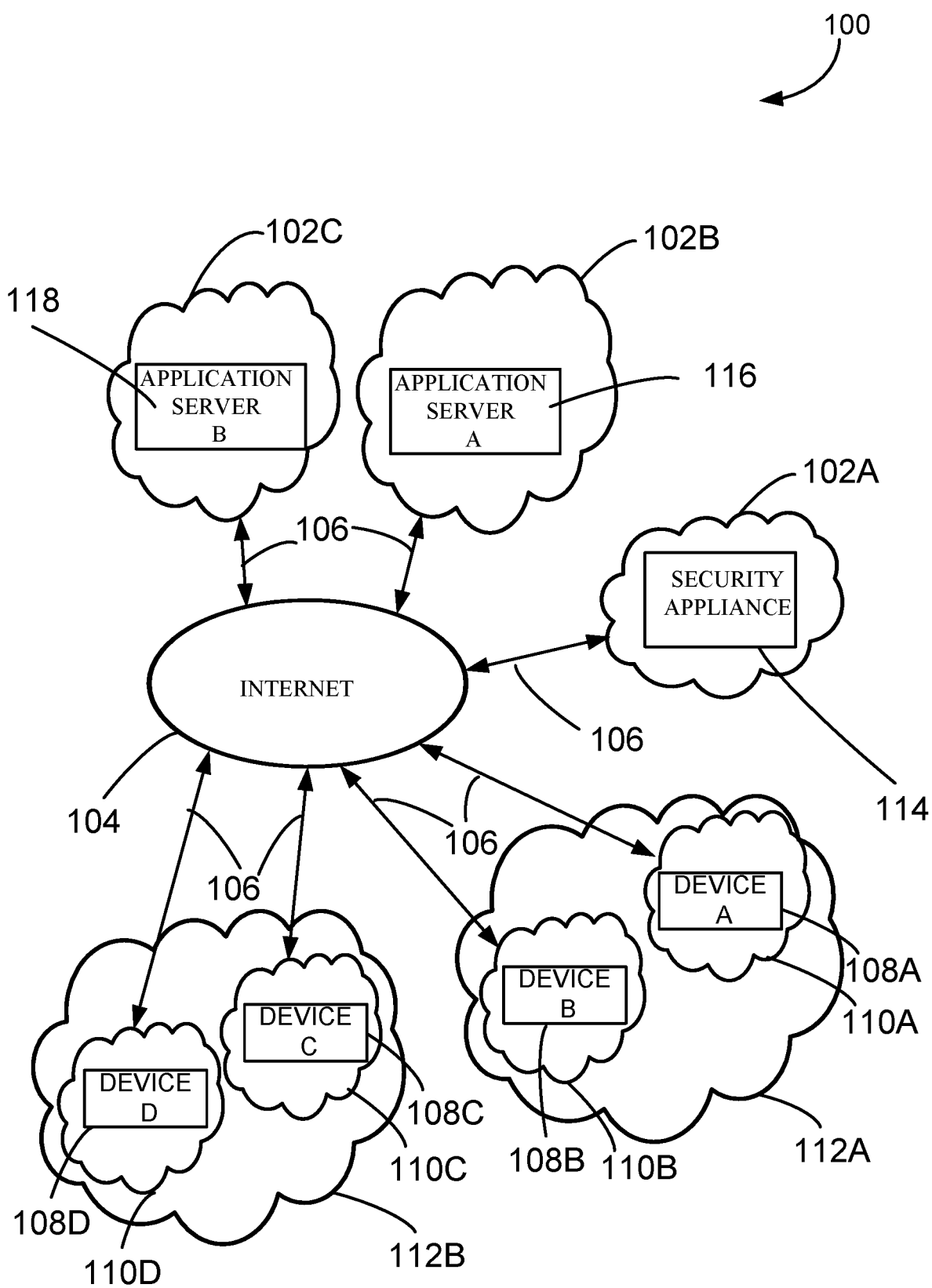
FIG. 1 shows an example computing environment with example security appliance and example security devices of this disclosure, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a systems and methods for generating an address for an object, based on its location. Referring now to the drawings, where similar reference characters denote corresponding features consistently throughout the figures, various examples of this disclosure is described.

FIG. 1 depicts an example network computing environment 100. The network computing environment 100 may have a plurality of computing resources, for example, computing resources 102A, 102B and 102C, all connected to internet 104, over link 106. In some examples, computing resources 102A, 102B and 102C may be a cloud computing resource, for example, cloud computing resource provided by vendors like Amazon® or Microsoft®. In some examples, the computing resources 102A, 102B and 102C may be a combination of standalone computing resources connected to the internet 106 and cloud computing resources.

FIG. 1 also depicts security device A 108A, security device B 108B, security device C 108C and security device D 108D. The security device A 108A, security device B 108B, security device C 108C and security device D 108D are also configured to be coupled to the internet 104 over link 106. In one example, the security device A 108A is located in a first location 110A, the security device B 108B is located in a second location 110B. The first location 110A and the second location 110B are located in a first neighborhood 112A. In one example, the security device C 108C is located in a third location 110C, the security device D 108D is located in a fourth location 110D. The third location 110C and the fourth location 110D are located in a second neighborhood 112B. Although only one security device is shown in each of the first location 110A, second location 110B, third location 110C and fourth location 110D, there might be multiple security devices in each of the first location, second location, third location and fourth location.

A security appliance 114 may be executed in computing resource 102A. Additionally, one or more application servers may be executed in computing resource 102B and 102C. As an example, application server A 116 is executed on computing resource 102B and application server B 118 is executed on computing resource 102C. As one skilled in the art appreciates, application servers may be configured to provide one or more services.

In some examples, application servers may be configured as a map server, configured to provide a map associated with a location. In some examples, application servers may be configured as an image processor, capable of identifying various images, based on detecting one or more attributes of the image. In some examples, application servers may be configured as authentication servers, configured to authenticate a user to provide access to various services and functions. For example, selective access to the security appliance may be granted to one or more users, based on verification of credentials of a user by the authentication server. As one skilled in the art appreciates, these are only some of the examples of functions and features of application servers and application servers may be configured to provide various other services.

Figure 2:
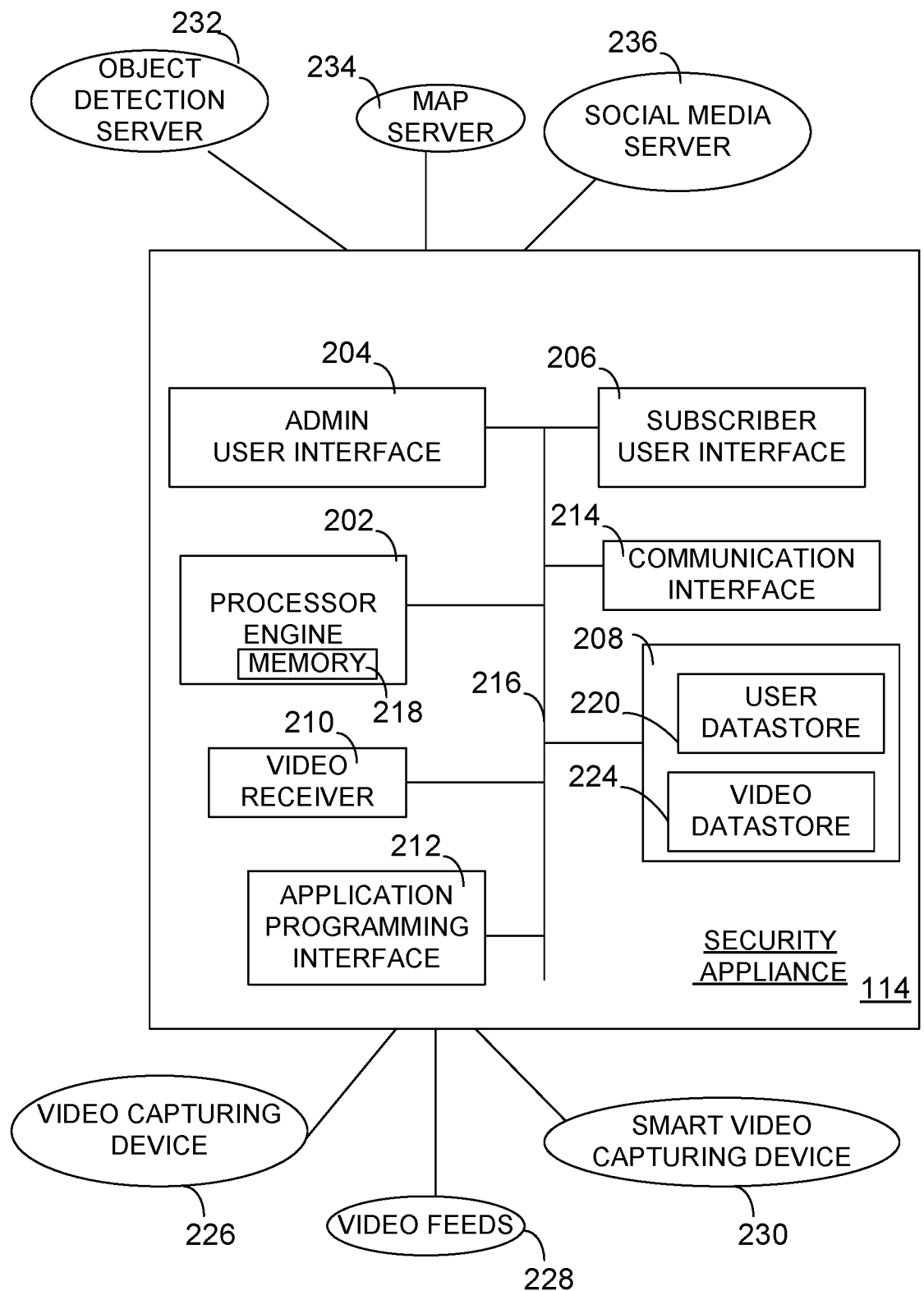
FIG. 2 depicts block diagram of an example security appliance of this disclosure.

Now, referring to FIG. 2, example security appliance 114 of this disclosure will be described. The security appliance 114 includes a processor engine 202, admin user interface 204, subscriber user interface 206, data store 208, video receiver 210, application programming interface (API) 212 and a communication engine 214, all coupled over a bus 216. Various function and features of the security appliance 114 will now be described. Detailed operation of the security appliance 114 will be later described with reference to additional examples and figures.

The processor engine 202 is configured to perform various arithmetic and logical functions of the security appliance 114. The memory 218 is used to stored and retrieve various programs, sub-routines, including transient and permanent information used or created by the processor engine 202. The data store 208 is used to store and retrieve various information generated, received or used by the security appliance 114. In one example, the data store 208 may include a user data store 220 and a video data store 224.

The admin user interface 204 is configured to present an admin user interface to receive one or more information from an admin user of the security appliance 114. As one skilled in the art appreciates, an admin user may have certain privileges that may be different from a subscriber user. The subscriber user interface 206 is configured to present a subscriber user interface to receive one or more information from a subscriber user of the security appliance 114. As one skilled in the art appreciates, a subscriber user may have certain privileges that may be different than an admin user. In one example, various information received from a subscriber user may be stored in the user data store 220.

The video receiver 210 is configured to receive images or video into the security appliance. In one example, the images or video received may be stored in the video data store 224. Video or images may be received from various sources, for example, from a video capturing device 226, a video feed 228 or a smart video capturing device 230. In some examples, a video capturing device 226 may capture a plurality of images, as a video chunk for a short duration of time, sometimes in the range of 30 to 60 seconds.

In some examples, the video capturing device 226 may push the captured video chunk to the security appliance 114. In some examples, the video capturing device 226 may send the video chunk to a designated storage location for storage, for example, a storage location in a computing environment, as an example, a cloud storage device. In some examples, a link to the stored location may be sent to the security appliance 114 for retrieval. In some examples, the security appliance 114 may be configured to retrieve the details of the link and access the link to retrieve the stored video chunk at the storage location. In some examples, the security appliance 114 may periodically retrieve the stored video chunk from the storage location.

In yet another example, the storage device may be configured to periodically send video feeds 228 to the security appliance 114. In yet another example, a smart video capturing device 230 may send or push the video chunk to the security appliance.

As one skilled in the art appreciates, various video chunks received by the security appliance 114 may conform to different protocols. The video receiver 210 is configured to decipher various video chunks and attributes related to the video chunks. The video and corresponding attributes are stored in the video data store 224 for further processing. Some of the attributes may include the identification of the security device, location of the security device, time stamp indicating when the video chunk was recorded and the likes.

The application programming interface 212 provides an interface to communicate with various external services, for example, services provided by one or more application servers. In one example, the application programming interface 212 may provide an interface to communicate with an object detection server 232. In one example, the application programming interface 212 may provide an interface to communicate with a map server 234. In yet another example, the application programming interface may provide an interface to communicate with a social media server 236.

As one skilled in the art appreciates, the security appliance 114 may communicate with various external devices using one or more different communication protocols. The communication engine 214 is configured to communicate with external devices, using one or more protocols recognized by one or more external devices.

Figure 3:
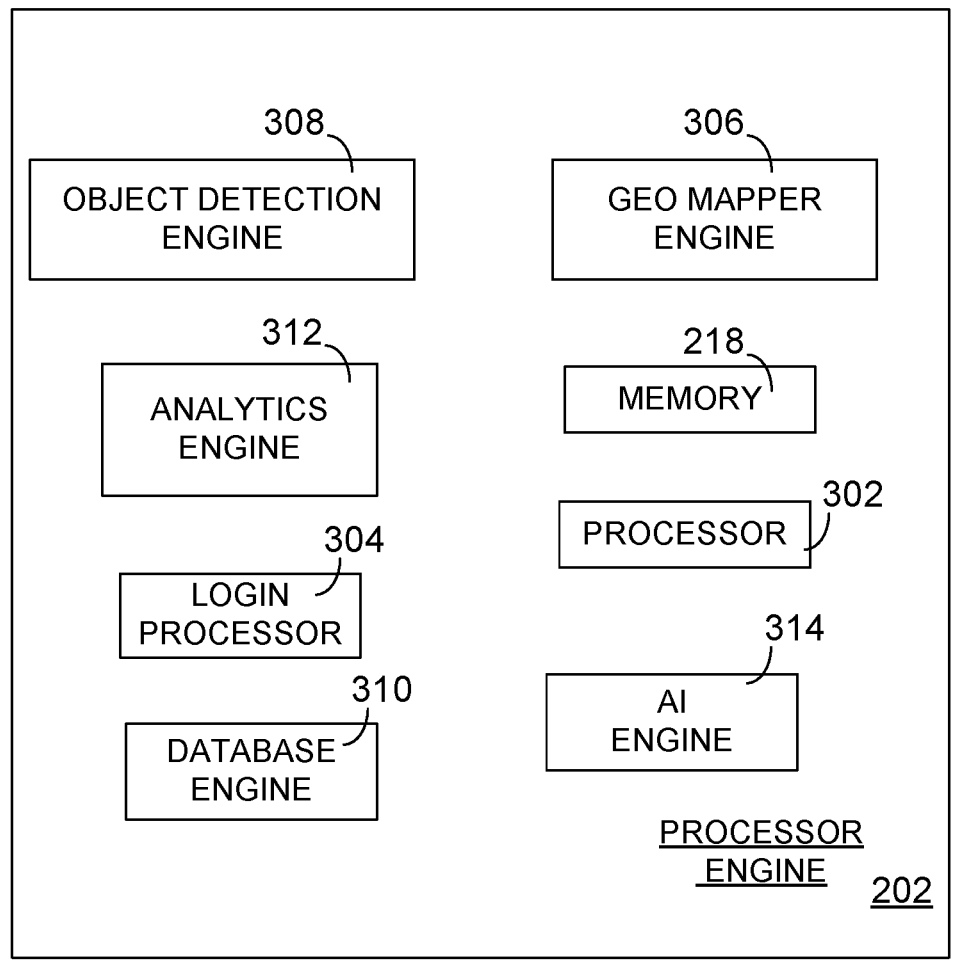
FIG. 3 shows an example block diagram of a processor engine of the security appliance, according to an example of this disclosure.

Having described an example security appliance 114 of this disclosure, now referring to FIG. 3, an example processor engine 202 is described. The processor engine 202 includes a processor 302 and memory 218. The processor 302 is configured to perform various arithmetic and logical operations. The memory 218 is used to stored and retrieve various programs, sub-routines, including transient and permanent information used or created by the processor engine 202. In one example, the processor engine 202 includes a login processor 304, geo mapper 306, an object detection engine 308, a database engine 310, an analytics engine 312, and an AI engine 314.

The login processor 304 is configured to receive various information, for example, user name and password for verification, verify the credentials and grant selective access to various functions and features of the security appliance 114 to a user. In one example, credential information may be received from a subscriber user, who interacts with the security appliance 114 using the subscriber user interface 206. In another example, credential information may be received from an admin user, who interacts with the security appliance 114 using the admin user interface 204.

The geo mapper engine 306 is configured to present a geo map of the location of the security device. For example, the geo mapper engine 306 may receive an address of the location of the security device from a user and based on the received address, retrieve a geo map of the location, for example, from a map server. The retrieved geo map of the location of the security device may be selectively presented to the user on a display device, by the security appliance 114.

The object detection engine 308 is configured to analyze the received video chunks and detect one or more objects present in the received video chunk. Once an object is identified, one or more attributes of the object are detected. The object along with one or more detected attributes are stored in the data store. In some examples, the attributes of the object may be referred to as meta data for the object. The object along with the meta data for the object is stored in a data store, along with a time stamp corresponding to the video chunk and the security device that produced the video chunk.

The database engine 310 is configured to communicate with one or more data stores. In some examples, the database engine 310 may be configured to retrieve stored video chunks in a data store. In some examples, the data store may be local or internal to the security appliance 114. In some examples, the data store may be external or remote to the security appliance 114, for example, accessible over the link 106. In some examples, the database engine 310 is configured to store the object and the meta data associated with the object in a data store. The data store may be internal to the security appliance 114, for example, data store 208 or a data store external to the security appliance 114. In some examples, the database engine 310 may associate one or more user information to the video chunk and the detected objects from the video chunk.

The analytics engine 312 is configured to analyze various detected objects and their attributes and develop a story regarding the detected object. For example, the movement of the object within the neighborhood. The analytics engine 312 may also develop statistics related to detected objects, incidents observed in a given neighborhood over time and the likes.

The AI engine 314 may be configured to analyze various activities detected by the security appliance for a given neighborhood, generate historic data of activities detected for a given neighborhood, generate indicators of likely future events in a given neighborhood or other neighborhoods. For example, break-ins may happen in one neighborhood on certain days or times of the week and a similar break-ins may happen in another neighborhood on certain other days or times. Based on the analysis of the historic information, the AI engine 314 may predict a likely future event in another neighborhood, based on activities in one neighborhood.

Figure 4A:
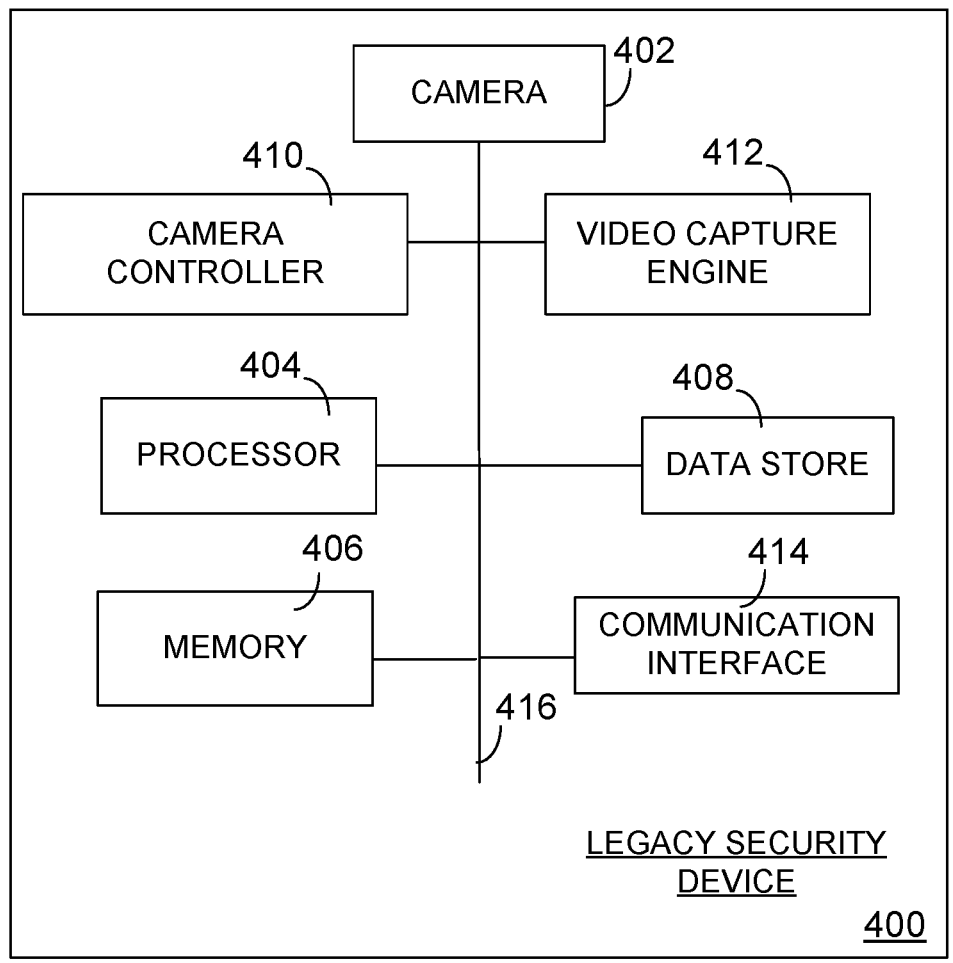
FIG. 4A shows an example block diagram of a legacy security device, according to an example of this disclosure.

Now referring to FIG. 4A an example legacy security device 400 is described. In one example, the legacy security device 400 may correspond to one or more of the security devices 108A, 108B, 108C and 108D, previously described with reference to FIG. 1. Now, referring back to FIG. 4A, the legacy security device 400 includes a camera 402, processor 404, a memory 406, a data store 408, a camera controller 410, a video capture engine 412, and a communication interface 414, all coupled over a bus 416. The camera 402 is configured to take images of the surroundings viewable by the camera 402. The processor 404 is configured to perform various arithmetic and logical functions of the legacy security device 400. The memory 406 is used to stored and retrieve various programs, sub-routines, including transient and permanent information used or created by the processor 404. The data store 408 is used to store and retrieve various information generated, received or used by the legacy security device 400.

The camera controller 410 is configured to selectively control various functions of the camera 402. In one example, a sensor (not shown) may be disposed in the legacy security device 400, for example, in the housing of the camera 402, to detect any movement in the view of the camera 402 and send a trigger signal to the camera controller 408. Based on the received trigger signal, the camera controller 408 may selectively turn on the camera 402 to capture any images visible to the camera 402. The images captured by the camera 402 is processed by the video capture engine 412. The processed video is then stored in the data store 408 for further action. In one example, processing of the video may include one or more of encoding the video in a known or proprietary format, enhancing the video, compressing the video and encrypting the video. In one example, the communication interface 414 may be used to communicate with external devices. In some examples, an alert signal may be sent to a user, by the communication interface 414.

In some examples, the legacy security device 400 may be coupled to a digital video recorder (DVR) (not shown) which may be configured to communicate with the security device 400 and store one or more of the video images captured by the security device 400. In some examples, the legacy security device 400 may be configured to communicate over the internet and store one or more of the video images in a storage device accessible over the internet. In some examples, the DVR may be configured to communicate over the internet and store one or more of the video images in a storage device accessible over the internet.

In some examples, video images stored in the storage device accessible over the internet may be selectively retrieved by the security appliance 114. In some examples, the security appliance 114 may be provided with access information to access the stored video images from the DVR. In some examples, the stored video images in the legacy security device 400 may be accessible by the security appliance 114. In some examples, a user may selectively upload the stored video images to the security appliance 114.

Figure 4B:
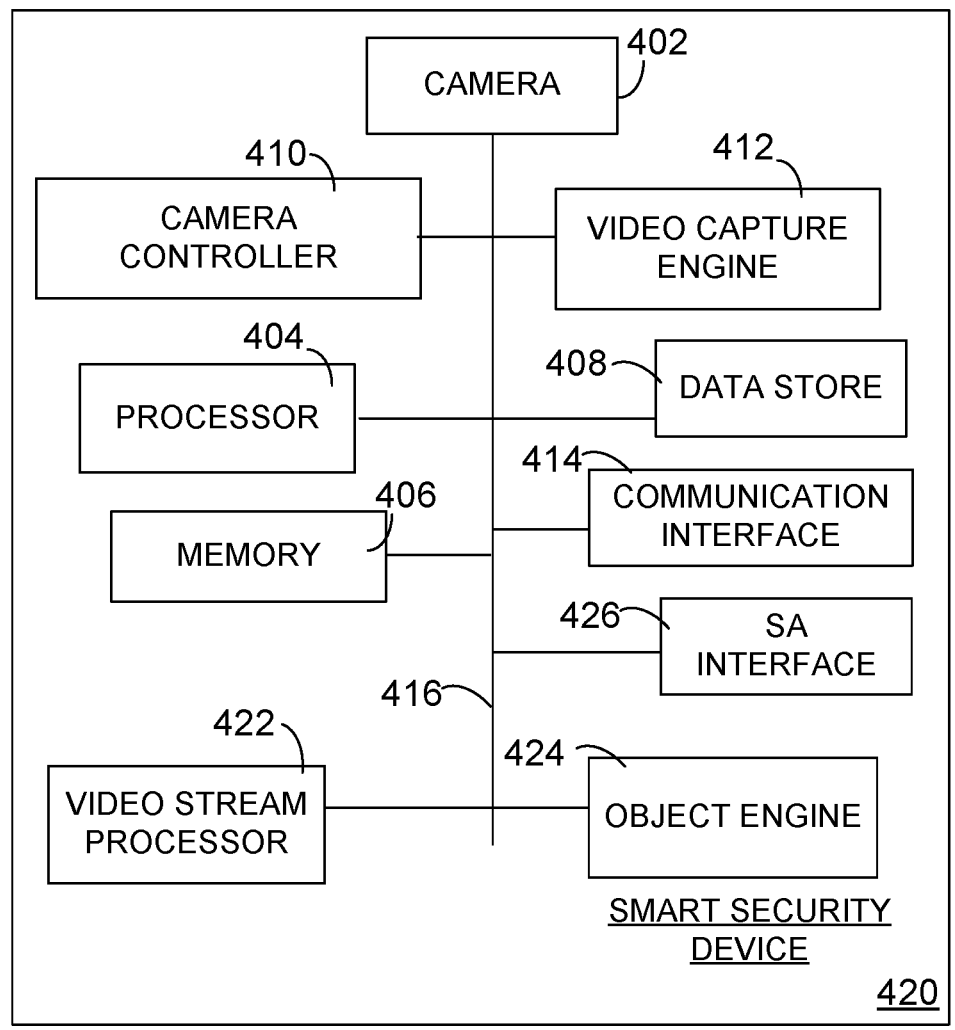
FIG. 4B shows an example block diagram of a smart security device, according to an example of this disclosure.

Having described a legacy security device 400, a smart security device 420 will now be described with reference to FIG. 4B. Now referring to FIG. 4A an example smart security device 420 is described. In one example, the smart security device 420 may correspond to one or more of the security devices 108A, 108B, 108C and 108D, previously described with reference to FIG. 1. Now, referring back to FIG. 4B, the smart security device 420 is similar to legacy security device 400 in that the smart security device 402 includes a camera 402, processor 404, a memory 406, a data store 408, a camera controller 410, a video capture engine 412, and a communication interface 414, all coupled over a bus 416. In addition, the smart security device 420 includes a video stream processor 422, an object engine 424 and a SA interface 426. These elements will now be described.

The smart security device 420 functions similar to legacy security device 400 in that video images are captured and stored in the data store 408. The video stream processor 422 retrieves the stored video images and identifies one or more objects in the video images and sends the objects for further processing by the object engine 424. The object engine 424 identifies various attributes of the object and creates meta data associated with the detected object. The detected object along with the meta data is stored in the data store 424. In one example, the object engine 424 classifies one or more detected objects as known objects, based on observing the presence of the detected object in multiple video streams over time. Detected objects that do not occur frequently may be classified as an unknown object. In one example, the unknown object and associated meta data may be sent to the security appliance, by the smart security device.

The SA interface 426 is configured to communicate with the security appliance 114. In one example, the security appliance 114 may send a command to the smart security device to initiate capture of the images by the camera 402. For example, if there are multiple smart security devices in a neighborhood, and one of the smart security device sends a message to the security device that an unknown object was detected, the security appliance 114 may selectively enable other smart security devices in the neighborhood to initiate capture of the video images by their camera. Objects detected by these other smart security devices may be classified as known or unknown object. If multiple smart security devices detect the same object, based on a time of detection and location of the smart security device, a possible path the object moved in the neighborhood is determined.

In some examples, objects classified as unknown may be sent to a user to classify. In some examples, the smart security device 420 may send the objects classified as unknown to the user for classification. In some examples, security appliance 114 may send the objects classified as unknown to the user for classification. Based on user response, the objects classified as unknown may be reclassified as a known object. In some examples, updated classification of the object may be stored in the smart security device 420. In some examples, the updated classification of the object may be stored in the security appliance 114.

In some examples, the security appliance 114 may send one or more objects it has received from security devices in the neighborhood to the smart security device 420 for identification. The smart security device 420 may compare the received object and compare the received objects with objects stored in the data store 408 for a comparison. If the received object matches one or more of the stored objects that are classified as known, the smart security device 420 responds to the security device 114, indicating the received object is a known object.

Figure 5A:
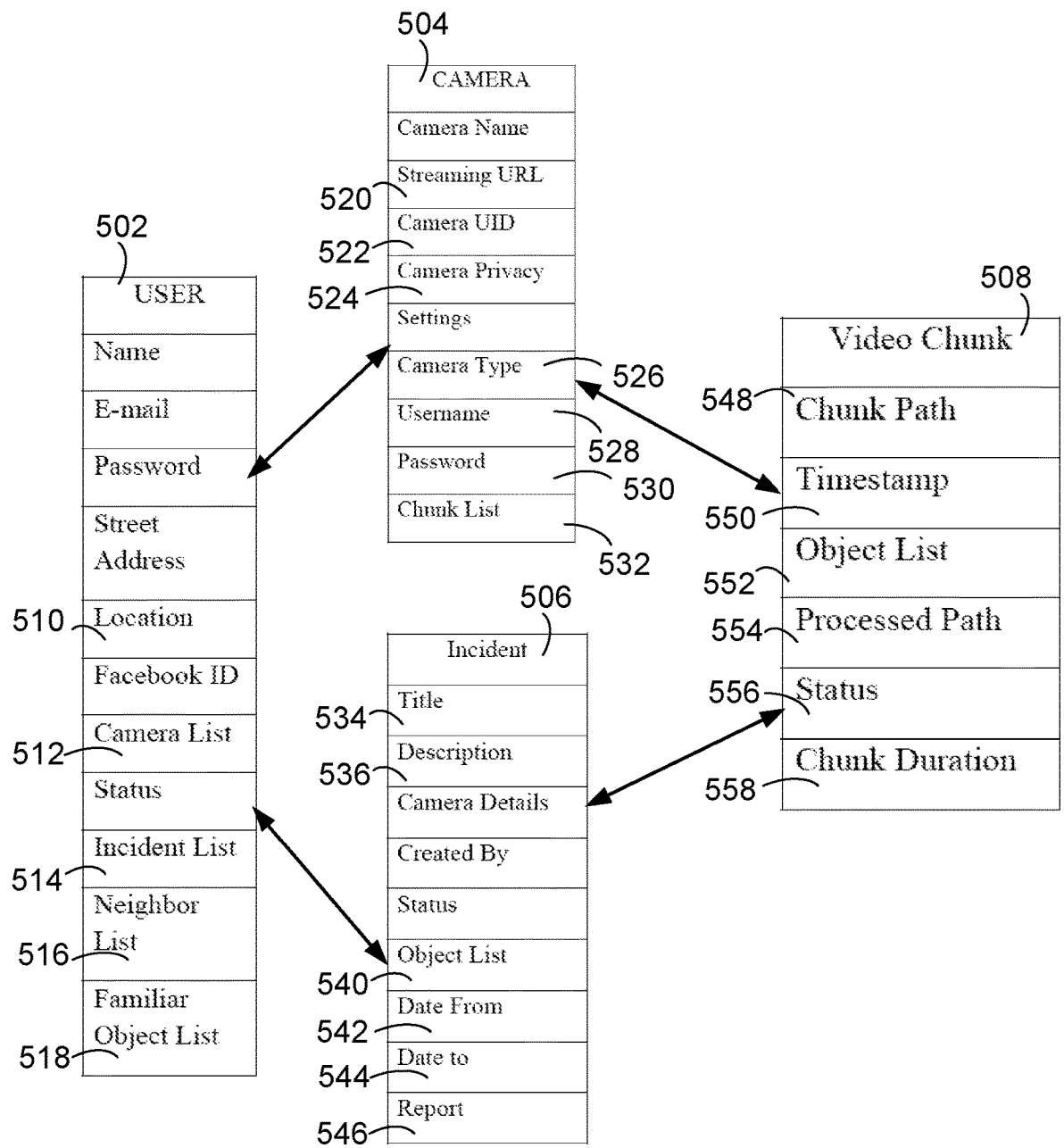

Now referring to FIGS. 5A and 5B, example database schema for use with this disclosure is described. Now, referring to FIG. 5A, table 502, various attributes associated with a user is shown. Table 504 shows various attributes of a camera (sometimes referred to as a security device associated with the user. Table 506 shows various attributes of an incident associated with the user. Table 508 shows various attributes associated with a video chunk is described. In one example, the camera is associated with the video chunk. In one example, the incident is associated with the video chunk.

Now, referring to table 502, some of the attributes of interest for user are location 510, camera list 512, incident list 514, neighbor list 516 and familiar object list 516. Location 510 indicates the location of the user. In one example, the location of the user may include a street address. In one example, the street address may be mapped to a geo location or geo coordinates, like latitude and longitude. Camera list 512 indicates one or more cameras associated with the user. Incident list 514 indicates incidents reported by the user. Neighbor list 516 indicates neighbors associated with the user. As one skilled in the art appreciates, a neighbor will be another user, with associated user, camera, incident and video chunk tables. Familiar object list 518 corresponds to objects determined to be known object based on classification of objects captured by one or more cameras associated with the user.

Now, referring to table 504, some of the attributes of interest for a camera are described. Streaming URL 520, which corresponds to a storage location where video chunks from the camera are stored. In one example, the streaming URL 520 may be used by the security appliance to selectively retrieve stored video chunks. As previously described, in some examples, the storage location may be local to the security device and in some examples, the storage location may be external to the security device. Camera UID 522 corresponds to a unique identification for the camera. Camera privacy 524 corresponds to a privacy setting for the camera. A user may selectively assign a privacy setting for the camera, for example either as a "public" camera or a "private" camera. If the privacy setting of a camera is set as "public", then, the video chunks captured by the camera may be accessible to the security appliance. If the privacy setting of the camera is set as "private", then, the video chunks captured by the camera may not be accessible to the security appliance. In some examples, further granularity in the privacy settings may be provided. One example of further granularity may include assigning a "protected" category, wherein the video cannot be shared with neighbors, but can be processed by the security appliance. Another example of further granularity may include assigning a "Time-limited public", meaning the security appliance can retain the video only for a limited period of time. In one example, a user may be provided an option to select the time period. Camera type 526 may indicate the type of camera, for example, a legacy security device or a smart security device. Username 528 and password 530 are associated with the access control credentials to access the camera. Chunk list 532 corresponds to the list of video chunks created and stored by the camera.

Now referring to table 506, some of the attributes of interest for incident are described. Title 534 corresponds to a title of the incident. In one example, this is created by the user. Description 536 corresponds to a brief description of the incident. In one example, this is created by the user. Camera details 538 corresponds to the camera that captured the incident. Object list 540 corresponds to the list of objects observed in the video chunk that corresponds to the incident. Date from 542 and date to 544 correspond to a time window during which the incident took place. For example, if a package was delivered at 2:00 PM on Jan. 10, 2019 and was noticed missing at 6:00 PM on Jan. 10, 2019, the date from 542 would correspond to 2:00 PM on Jan. 10, 2019 and date to 544 would correspond to 6:00 PM on Jan. 10, 2019. Report 546 corresponds to the report associated with the incident.

Now, referring to table 508, some of the attributes of interest for video chunk are described. Chunk path 548 refers to the path, address or url to the stored video chunk. Timestamp 550 corresponds to the time associated with when the video chunk was captured. Objectlist 552 corresponds to the objects detected in the video chunk. Processed path 554 corresponds to the path, address or url to the processed video chunk. As previously described, the video chunk is processed or analyzed for detecting objects and detected objects along with the meta data associated with the detected object are stored. Processed path 554 corresponds to the path, address, or url that links to the processed video chunk. Status 556 corresponds to whether the video chunk has been processed or not. Chunk duration 558 corresponds to the duration of the video chunk. As previously described, duration of a video chunk may be of the order of about 30 seconds to about 60 seconds.

Now, referring to FIG. 5B, table 560 described various attributes associated with a neighborhood. Name 562 refers to a name of the neighborhood. Name of the neighborhood may be set by the admin user of the security appliance. Geographic boundaries 564 corresponds to the meet and bound of the neighborhood. In some examples, various streets in the neighborhood may be used to draw a geographic boundary. In some examples, a pre-defined area may be used to define the geographic boundaries. In some examples, a range of latitude and longitude may be used to define a geographic boundary for the neighborhood. User list 566 corresponds to the users located within the geographic boundary of the neighborhood. Neighborhood watch info 568 corresponds to names of people associated with the neighborhood watch program for the neighborhood. Familiar objects list 570 corresponds to list of objects that have been classified as known or friendly objects within the neighborhood.

Now, referring to FIG. 5C, table 580, various attributes associated with an object is described. Referring to table 580, various attributes associated with an object may include object ID 582, object classification 584, object identification 586, timestamp 588, camera type 590, camera location 592, object characteristics 594, linked cameras 596, and object history 598. In some examples, various attributes associated with an object may be referred to as meta data associated with the object.

Object ID 582 may correspond to a unique identifier for the object. Object ID 582 may be numeric, alphabet or a combination of alpha-numeric number. Object classification 584 identifies a class or group to which the object belongs to. For example, based on the analysis of the video chunk, one or more objects may be identified. Each identified objects is given an object ID. Next, the object is analyzed to determine which group it belongs to. For example, a person, vehicle, animal etc. Based on the analysis, Object classification 584 is updated to indicate the group to which the object belongs. Timestamp 588 refers to the time at which the object was detected. Camera type 590 corresponds to the type of camera where the object was captured. Camera location 592 corresponds to the location details of the camera that captured the image of the object.

Object characteristics 594 corresponds to various characteristics of the object. In one example, the object characteristics 594 may be different, based on the object classification 584. Some of the object characteristics 594 may be whether the object is a friendly, unfriendly or unknown object. In case of a vehicle, the object characteristics 594 may be the color of the vehicle, license plate number and the likes. In one example, objects that are friendly, may be associated with corresponding neighborhood table shown in FIG. 5B, for example, as part of the familiar object list.

Linked cameras 596 corresponds to a list of other cameras that are linked or associated with the camera where the object was captured. For example, if there are multiple cameras in a location and an object was captured in one camera and later classified, it may be beneficial to associate the object with other cameras in the same location.

Object history 598 corresponds to history associated with the identified object, for example, if the object was a subject or target of prior incidence analysis.

Now, referring to FIGS. 6A and 6B, various queries and activities supported by the security appliance 114 is described. Table 602 shows queries related to a user. Table 604 shows queries related to a camera. Table 606 shows queries related to the incidents. Table 608 shows queries related to video chunks. Table 610 shows queries related to neighborhood. Table 612 shows queries related to business logics. Table 614 shows various queries, their corresponding input and output. For example, column 616 shows various queries. Column 618 shows input for the query and column 620 shows output for query if applicable. For example, referring to row 622, for "Create Incidents" query, the input is "incident details". The "incident details" may correspond to one or more of the attributes described with reference to table 506 in FIG. 5A. For example, incident details may include title, date, time range, description, cameras and the like.

Figure 7A:
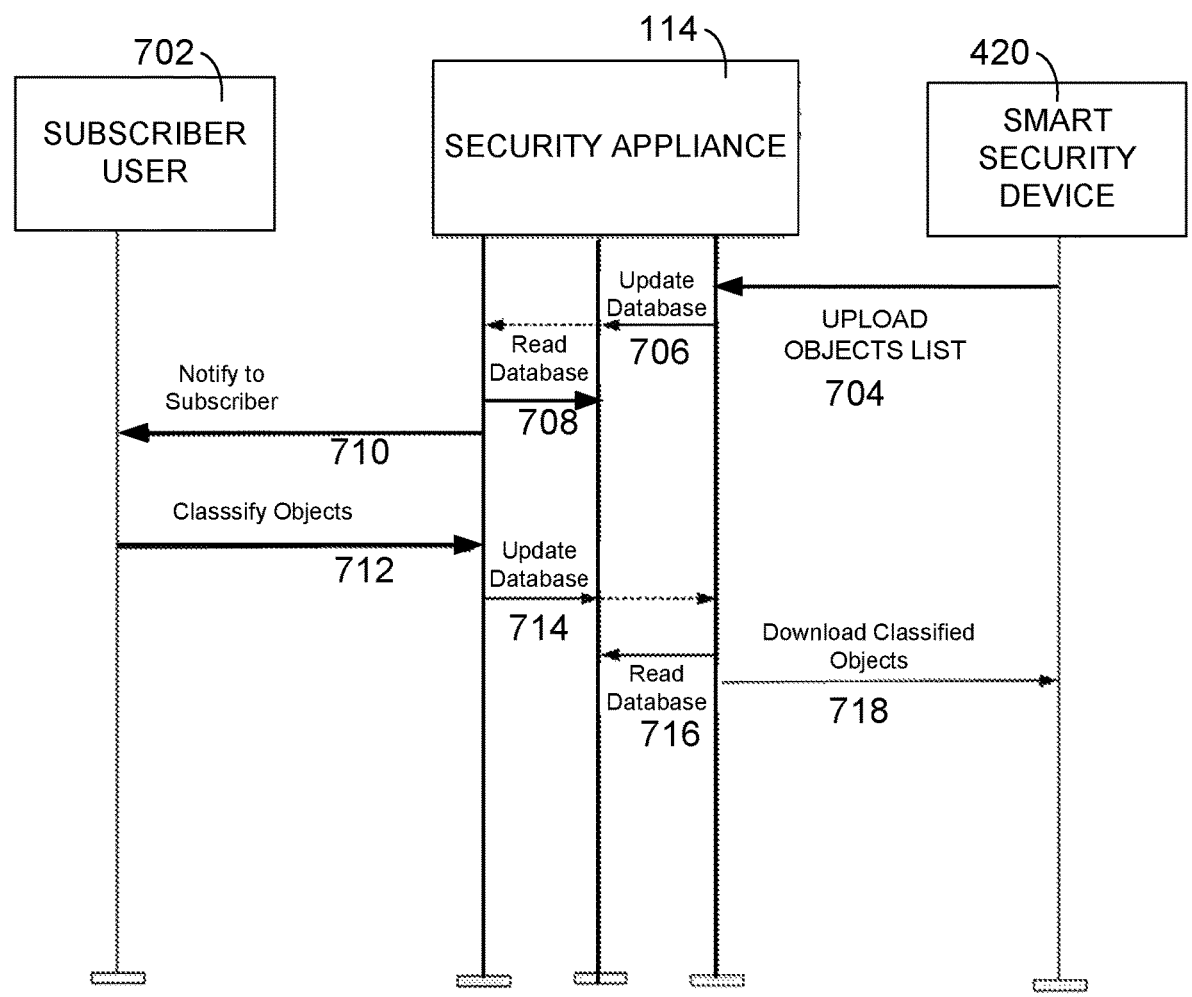
FIG. 7A shows an example sequence flow diagram, according to an example of this disclosure.

Now, referring to FIG. 7A, an example sequence flow diagram 700 is described. The sequence flow diagram 700 illustrates various communication and actions between the security appliance 114, smart security device 420 and a subscriber user 702 associated with the smart security device. In one example, the smart security device 420 upload object list (704) to the security appliance 114. The object list may contain lists of objects discovered by the smart security device 402. The object may be of many types, for example, a facial image, a vehicle, a license plate, a car and the likes. The security appliance 114 updates the objects table in the database and associates the objects to the corresponding smart security device (706). Next the stored objects in the database are read by the security appliance 114 and user associated with the smart security device 420 is identified (708). Next, the security appliance 114 notifies the identified user to review the objects for classification (710). The identified user may be notified by one or more methods, for example, via e-mail, text message or via a smart phone application. The identified user reviews the objects and classify the objects, for example, as friendly object (or known object), unfriendly object and unknown object (712). In one example, the identified user is presented with each of the objects and a list of classification to be chosen by the identified user. The security appliance 114 receives the classification and updates the database with the classification for the objects (714). The security appliance 114 then reads the classified objects (716) and sends the classified objects and their classification to the smart security device (718). In one example, the classified objects and their classification are sent to all the smart security devices associated with the identified user.

Figure 7B:
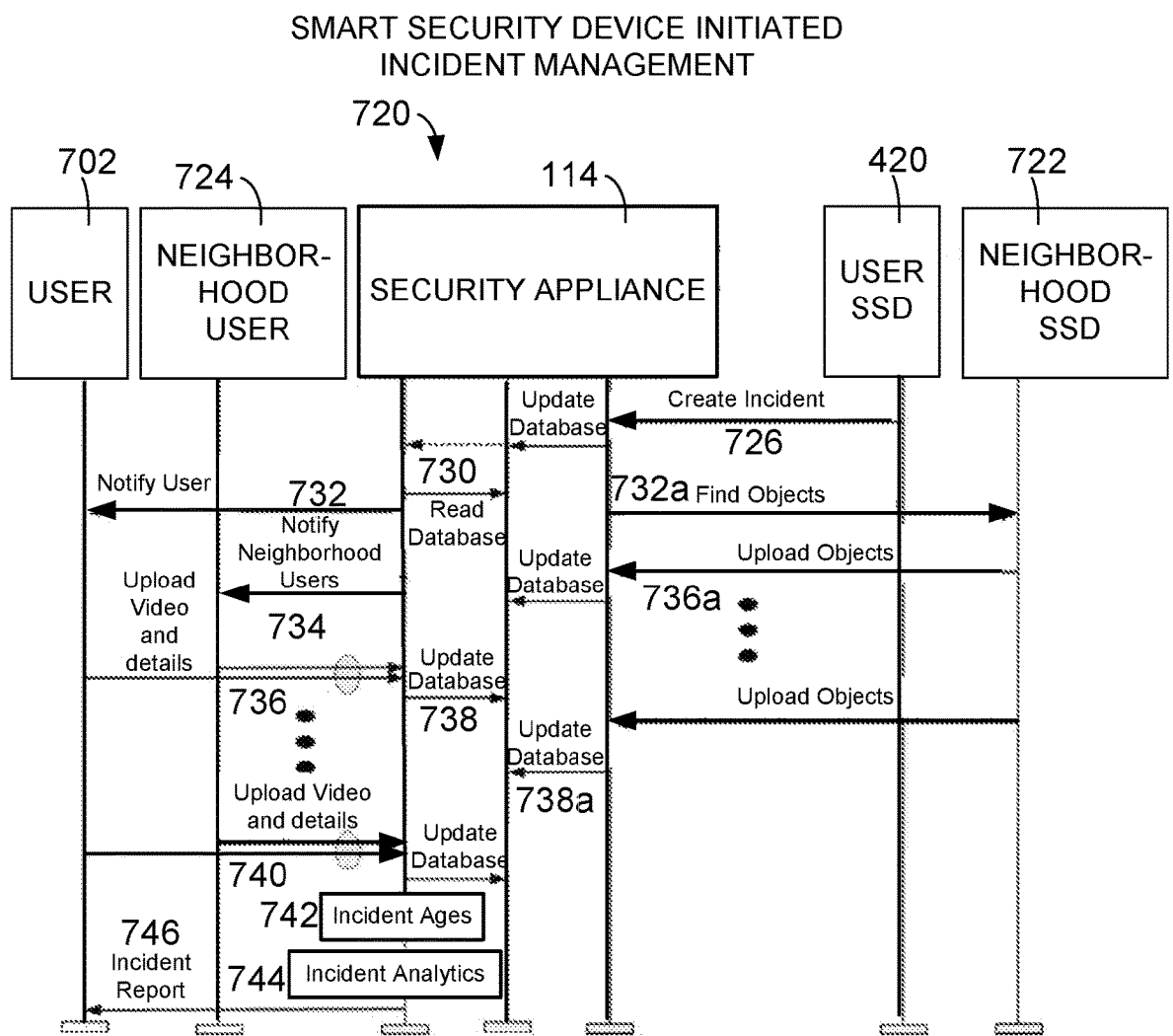
FIG. 7B shows another example sequence flow diagram, according to an example of this disclosure.

Now, referring to FIG. 7B, another example sequence flow diagram 720 is described. The sequence flow diagram 720 illustrates various communication and actions between the security appliance 114, smart security device 420, a subscriber user 702 associated with the smart security device, neighborhood smart security devices 722 and neighborhood users 724. The sequence flow diagram 720 illustrates an example smart security device initiated incident management.

The smart security device 420 sends a message to the security appliance 114 to create an incident (726). As one skilled in the art appreciates, the smart security device 420 can scan the video chunks and based on its analysis can initiate an incident, for example when an unknown or unfriendly object is identified. The message in one example includes camera ID, objects of interest and a timestamp.

The security appliance 114 updates the incident table in the database (728). The security appliance 114 then reads the incident details, identifies the user 702 associated with the smart security device 420 (730). The security appliance 114 then notifies the identified user about the new incident (732). In one example, the notification may include details of the incident and a request to the user 702 to upload any video images that may be relevant to the incident stored in legacy security devices, for example, based on the timestamp of the incident.

The security appliance 114 also notifies other subscribers or users in the neighborhood regarding the new incident (734). In one example, the notification may include details of the incident and a request to the users in the neighborhood to upload any video images that may be relevant to the incident stored in legacy security devices, for example, based on the timestamp of the incident.

The subscriber user and users in the neighborhood upload any video images of interest to the security appliance 114 (736). The security appliance 114 updates the database with the received video images (738).

In one example, the security appliance 114 also sends a message to other smart security devices in the neighborhood about the incident and request upload of objects relevant to the incident (732a). Smart security devices in the neighborhood send objects relevant to the incident to the security appliance 114 (736a). Received information from the smart security devices in the neighborhood are stored in the data store (738a).

Users may upload any additional video images, when the incident is still active (740). The incident age may be set to be a predefined time period, for example, one week (742). Various video images and objects received by the security appliance 114 is analyzed by the security appliance and an incident report is generated (744). In one example, the security appliance identifies set of objects detected by the user camera as well as cameras in the neighborhood. Based on the detected objects, a geospatial and temporal analysis is performed to determine movement of the detected object in the neighborhood, identification of unfamiliar objects and detection of anomalous behavior. Based on the analysis, the security appliance generates a report. In one example, the generated report may include one or more images, indicative of the evidence for the incident. The generated incident report is sent to the user associated with the smart security device 402 that initiated the incident (746).

In one example, the incident report may include time stamped video footage containing all objects of interest from the subscriber user's smart security device, time stamped video footage containing same objects of interest from the smart security devices in the neighborhood, time stamped video footage containing the same objects of interest from legacy security devices within the neighborhood, best fit track (or movement) of the object of interest across the neighborhood, and meta data pertaining to the object of interest (for example, license plate number, color/make/model of vehicle, build/height of a person and the like).

Figure 8:
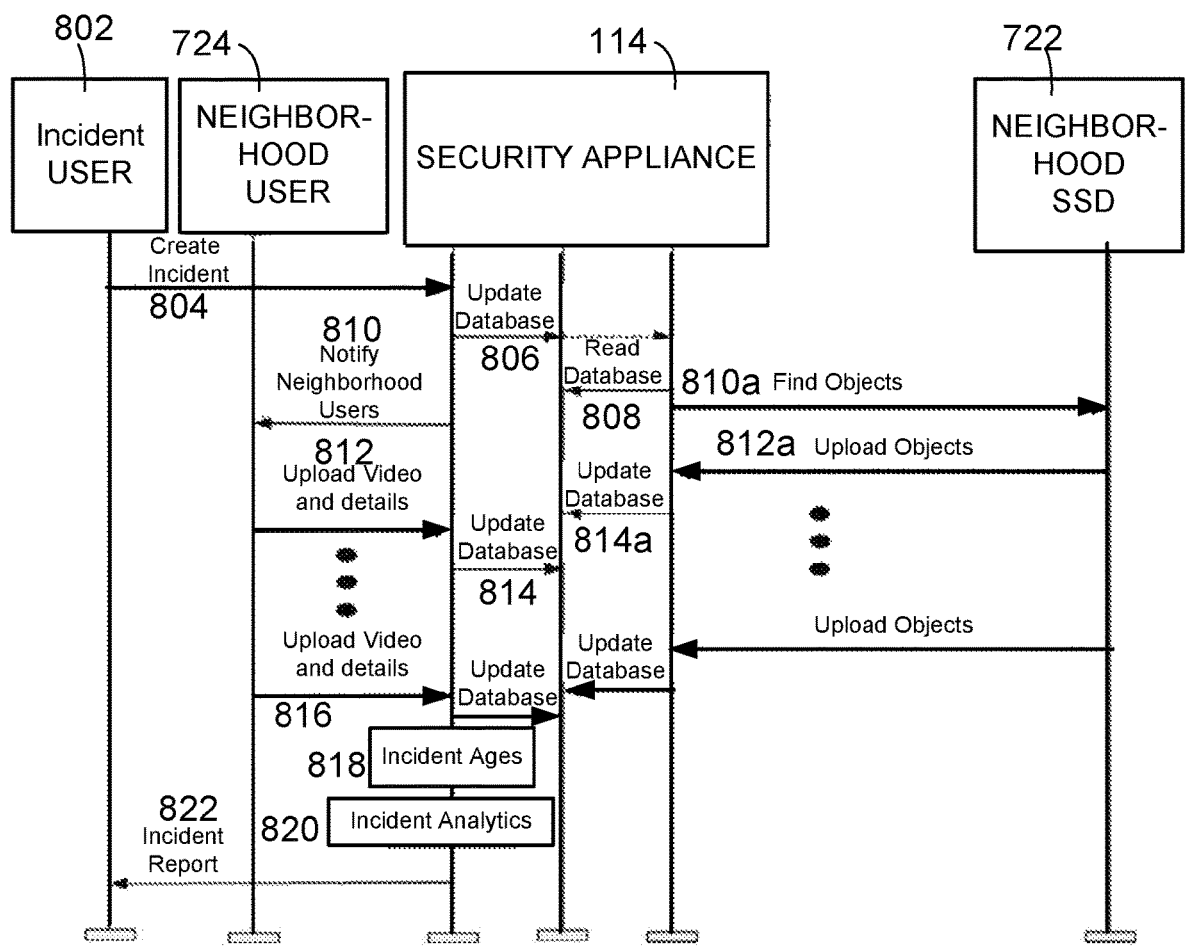
FIG. 8 shows yet another example sequence flow diagram, according to an example of this disclosure.

Now, referring to FIG. 8, another example sequence flow diagram 800 is described. The sequence flow diagram 800 illustrates various communication and actions between the security appliance 114, an incident user 802, neighborhood smart security devices 722 and neighborhood users 724. The sequence flow diagram 720 illustrates an example user initiated incident management.

Now, referring to flow diagram 800, an incident user 802 initiates an incident for processing by the security appliance 114 (804). In one example, the incident user 802 uploads a video image corresponding to the incident. The video image may be captured by a legacy security device. The security appliance 114 updates the incidents table in the database (806). The security appliance 114 reads the created incident and queries the subscriber table to identify the incident user (808). Then, the security appliance 114 determines the geographic area around the subscriber's neighborhood and retrieves a list of smart security devices in the subscriber's neighborhood.

The security appliance 114 then notifies all the subscribers or users in the neighborhood about the incident (810). In one example, the notification may include details of the incident and a request to the users in the neighborhood to upload any video images that may be relevant to the incident stored in legacy security devices, for example, based on the timestamp of the incident.

The users in the neighborhood upload any video images of interest to the security appliance 114 (812). The security appliance 114 updates the database with the received video images (814).

In one example, the security appliance 114 also sends a message to the smart security devices in the neighborhood about the incident and request upload of objects relevant to the incident (810a). Smart security devices in the neighborhood send objects relevant to the incident to the security appliance 114 (812a). Received information from the smart security devices in the neighborhood are stored in the data store (814a).

Users may upload any additional video images, when the incident is still active (816). The incident age may be set to be a predefined time period, for example, one week (818). Various video images and objects received by the security appliance 114 is analyzed by the security appliance and an incident report is generated (820).

In one example, objects received by the security appliance 114 is compared with a list of objects that have been associated with incidences that were reported and analyzed previously. In some examples, the list of objects from earlier reported incidences may be referred to as a suspect object list. In some examples, the objects may be auto detected by the security appliance, without any human interactions, In some examples, the objects may have to be presented to a user to help characterize various attributes of the object and identify if the object is of interest in the reported incidence. Once one or more objects of interest are identified, the security appliance 114 can check whether other security devices in the neighborhood have captured same object.

As one skilled in the art appreciates, once an object has been classified, for example, as a person or a vehicle, further analysis may be performed. For example, if the object is a person, face of the person can be extracted and features of the face (sometimes referred to as "faceprint") may be mapped and compared with other objects that were identified and classified in other security devices. In one example, there may be a list of known suspect person table, with extracted features of the face. This suspect person table may be searched for a possible match. In some examples, if there is a match, then, the image is discarded and a reference identifier of the suspect person may be used. If no match is found, then, the faceprint of the person may be stored for further classification. Over time, if the image of the person is captured at a given location in multiple occasions, the person may be classified as a known or friendly person, associated with that location. In one example, the person is also associated with the neighborhood.

If the object is classified as a vehicle, then, meta data associated with the vehicle may be selectively extracted, by analyzing the object. Extracted meta data for the vehicle may be stored in the object attribute table. Over time, if the vehicle is captured at a given location in multiple occasions, the vehicle may be classified as a known or friendly vehicle, associated with that location. In one example, the vehicle is also associated with the neighborhood.

Based on geospatial and temporal analysis, likely participation of the object of interest in the reported incidence is determined. Thereafter, an incident report is generated.

The generated incident report is sent to the incident user that initiated the incident (822). In one example, the incident report may include time stamped video footage containing all objects of interest from the incident user's security device, time stamped video footage containing same objects of interest from the smart security devices in the neighborhood, time stamped video footage containing the same objects of interest from legacy security devices within the neighborhood, best fit track (or movement) of the object of interest across the neighborhood, and meta data pertaining to the object of interest (for example, license plate number, color/make/model of vehicle, build/height of a person and the like).

Figure 8A:
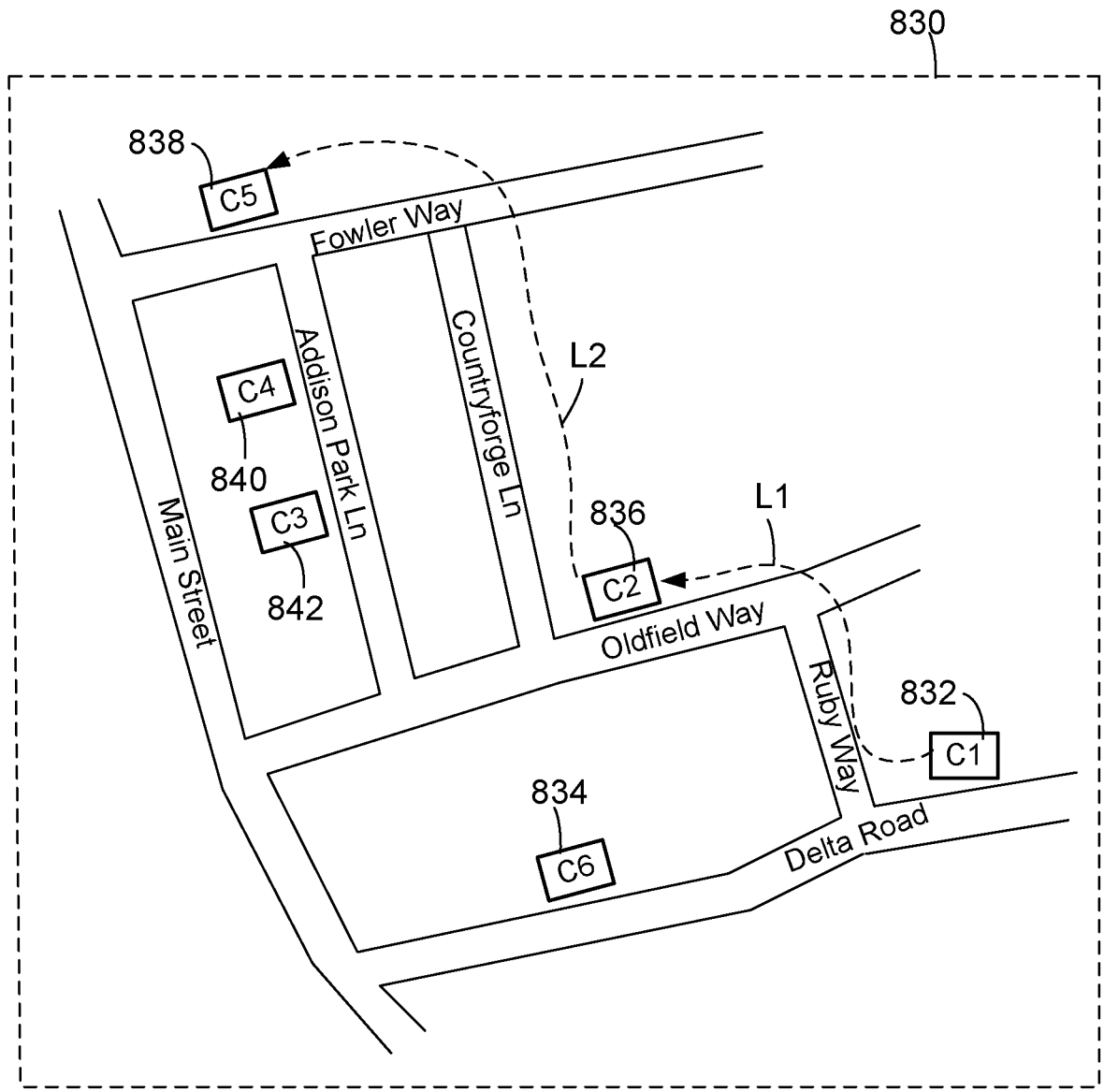
FIG. 8A shows an example neighborhood, with a plurality of security devices, devices, according to an example of this disclosure.

Now, referring to FIGS. 8A, 8B and 8C, an example incidence analysis will be described. Referring to FIG. 8A, an example neighborhood 830 is shown, with a street map and location of various devices, for example, cameras in the neighborhood 830. For example, cameras C1 832 and C6 834 are located along the "Delta Road", camera C2 836 is located along the "Oldfield Way", camera C3 838 is located on "Fowler Way", cameras C4 840 and C5 842 are located on "Addison Park Ln". Delta Road, Oldfield Way and Fowler Way all connect to Main Street. Ruby Way connects Delta Road and Oldfield Way. Countryforge Ln connects Oldfield Way and Fowler Way.

In one example, when an object is detected by one camera, it may send a signal to other neighborhood smart security devices to turn on the camera and capture the images. For example, when camera C1 detects an object or movement, it may send a signal to camera C2 and camera C6 to turn on the camera and capture the images. When camera C2 detects an object or a movement, camera C2 may send a signal to camera C3, camera C4 and camera C5 to turn on the camera and capture images. In one example, the signal will turn on the camera and capture images for a defined period of time, In one example, the defined period of time may be based on the distance between the location of the cameras and an estimated time it would take for a moving object to travel from one location to another location.

In one example, owner of camera C1 reports an incident, for example, tampering of his mailbox, on the night of Feb. 2, 2019. Objects captured by the camera C1 is reviewed for a defined time range. For example, two objects, object ID 215142 and object ID 215143 are identified. Based on the analysis of stored objects, an object tracking table for each of the identified objects are created. For example, referring to FIG. 8B, an object tracking table 850 is shown, for object with an object ID of 215142. And, referring to FIG. 8C, another object tracking table 860 is shown, for object with an object ID of 215143.

Now, referring to FIG. 8B, table 850, referring to rows 852 and 854, we notice that Camera C1 captured the object ID of 215142 at a time of "2 Feb. 2019 9:00 PM". Referring to rows 856 and 858, we notice that Camera C6 captured the object ID of 215142 at a time of "2 Feb. 2019 8:59 PM". Referring to rest of the rows of the object tracking table 850, we notice none of the other cameras (C2-C5) in the neighborhood 830 detected same object. In one example, various attributed of object ID 215142 may be stored in an object attribute table as previously described with reference to FIG. 5C, table 580. In one example, the object ID of 215142 may correspond to a friendly object, for example, a vehicle known to be parked at the location corresponding to Camera 1. Based on this analysis, object ID 215142 is concluded as an object not related to the reported incident. Further, based on the time stamp of camera C1 and C6, a likely path for the object ID 215142 can be predicted. In this case, given the time stamp of Camera C6 is prior to the time stamp of Camera C1, it may be concluded that object ID 215142 moved from the location of camera C6 to the location of camera C1. It may be further concluded that the object ID 215142 entered Delta Road from Main Street.

Now, referring to FIG. 8C, table 860, rows 862 and 864, we notice that Camera C1 captured the object ID of 215143 at a time of "2 Feb. 2019 11:02 PM". Further, referring to rows 866 and 868, we notice that camera C2 captured the object ID of 215143 at a time of "2 Feb. 2019 11:03 PM". Further, referring to rows 878 and 880, we notice that camera C5 captured the object ID of 215143 at a time of "2 Feb. 2019 11:05 PM". However, referring to rows 870-874 and 878-880, we notice that object ID of 215143 was not captured by camera C3, camera C4 and camera C6. In one example, various attributed of object ID 215143 may be stored in an object attribute table as previously described with reference to FIG. 5C, table 580. In one example, the object ID of 215143 is marked as an unknown object, based on the information stored in the object attribute table.

Now, a geospatial and temporal analysis of the data stored in the object tracking table 860 is performed. In one example, based on the address of the camera location, a corresponding geo location is retrieved. In one example, a request may be sent to a map server, with the address and receive corresponding geo location of the camera. In one example, the geo location may be the latitude and longitude of the location of the camera. In one example, distance between the cameras of interest may be calculated. In one example, a map server may be configured to provide a distance between various addresses. In some examples, the map server may be configured to provide the distance based on paths or roads that correspond to the address of the camera location. Next, based on the permitted speed limit in a neighborhood, an estimate of time to travel from one camera location to another camera location is calculated. Based on the time to travel from one camera location to another camera location, a possible route for the movement of the object is determined.

Now, referring to FIGS. 8A and 8C, a possible route for the movement of the object with an object ID of 215143 is determined. In one example, the distance between camera C1 and camera C2 is L1. Distance between camera C2 and camera C5 is L2. Based on the detection of the object with an object ID of 215143 by cameras C2 and C5, a likely path for the movement of the object is camera C1 location on Delta road to camera C2 location on Oldfield way via Ruby Way and camera C5 via Countryforge Ln. This likely path is further validated by comparing the difference in the timestamp of detecting the object ID 215143.

For example, there is a difference of one minute in timestamp between camera C1 and camera C2. Based on the distance of L1 and a time difference T1 of one minute, a likely speed of travel of the object ID 215143 is calculated. Likely speed of travel S1 may be calculated by dividing the time difference T1 by the distance L1. Calculated speed S1 is then compared with permitted speed limit P1 for the neighborhood to see if the calculated speed S1 is within a threshold value Q1 of the permitted speed limit P1. In one example, threshold value Q1 may be set to be within 10% of the permitted speed limit P1. In this example, the calculated speed S1 is within the threshold value Q1 of the speed limit P1. This conclusion validates that the object ID 215143 moved from location of camera C1 to location of camera C2.

Similarly, there is a difference of two minutes in timestamp between camera C2 and camera C5. Based on the distance of L2 and a time difference T2 of two minutes, a likely speed of travel of the object ID 215143 is calculated. Likely speed of travel S2 may be calculated by dividing the time difference T2 by the distance L2. Calculated speed S2 is then compared with permitted speed limit P1 for the neighborhood to see if the calculated speed S2 is within a threshold value Q1 of the permitted speed limit P1. In one example, threshold value Q1 may be set to be within 10% of the permitted speed limit P1. In this example, the calculated speed S2 is within the threshold value Q1 of the speed limit P1. This conclusion validates that the object ID 215143 moved from location of camera C2 to location of camera C5.

Referring back to FIG. 8A, we notice that there were two likely paths for the object ID 215143 to travel from location of camera C2 to location of camera C5, either via Countryforge Ln or via Addison Park Ln. However, cameras C3 and C4 located on Addison Park Ln did not detect the object ID 215143 during the time frame of interest. Therefore, the likely movement of object ID 215143 is concluded to be via Countryforge Ln. Further, based on the movement of the object ID 215143 from location of camera C2 to location of camera C5, it may also be concluded that the object ID 215143 proceeded on to Main Street.

As one skilled in the art appreciates, in some examples, more than one likely path may be predicted based on the analysis of the object tracking table. In such a scenario, a plurality of likely paths may be identified for the object of interest.

Figure 9:
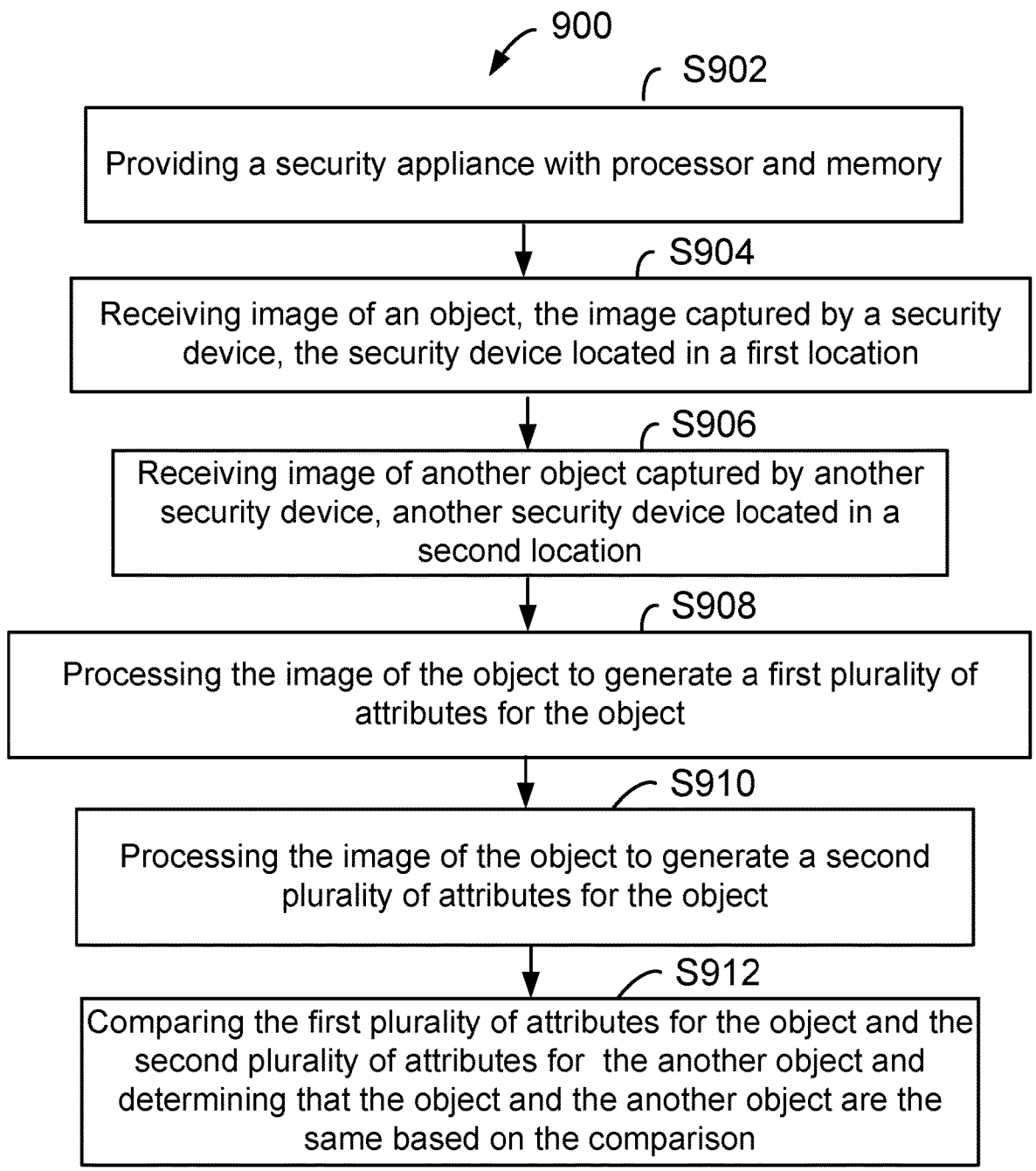
FIG. 9 shows an example flow diagram to determine an object, according to an example of this disclosure.

Now, referring to FIG. 9 an example flow diagram 900 is described. In block S902, a security appliance with a processor and memory is provided. For example, security appliance 114 as described with reference to FIG. 2 is provided.

In block S904, image of an object is received by the security appliance. The image is captured by a security device located in a first location. For example, image captured by security device A is received by the security appliance, as described with reference to FIG. 1. In one example, the image captured by security device C1 is received by the security appliance, as described with reference to FIG. 8A.

In block S906, image of another object is received by the security appliance. The image is captured by another security device located in a second location. For example, image captured by security device B is received by the security appliance, as described with reference to FIG. 1. In one example, the image captured by security device C2 is received by the security appliance, as described with reference to FIG. 8A.

In block S908, image of the object is processed by the security appliance to generate a first plurality of attributes for the object. For example, meta data of the object is created by analyzing the object. For example, meta data of the object may be created as described with reference to FIG. 5C.

In block S910, image of the another object is processed by the security appliance to generate a second plurality of attributes for the another object. For example, meta data of the another object is created by analyzing the object. For example, meta data of the object may be created as described with reference to FIG. 5C.

In block S912, the first plurality of attributes for the object and the second plurality of attributes for the another object is compared and based on the comparison, the object and the another object is determined to be the same. By comparing one or more attributes of the object and another object in the corresponding object table, the object and another object may be determined to be the same. For example, one or more object characteristics of the object may be compared to determine whether the object and another object are same.

The embodiments disclosed herein can be implemented through at least one software program running on at least one hardware device and performing various functions of the security appliance. Various functions of the security appliance as described herein can be at least one of a hardware device, or a combination of hardware device and software module. In some examples, one or more functions described with reference to the security appliance may be performed in the security device. For example, in some examples, analysis of the objects may be performed in the security device, for example, a smart security device. Based on the analysis of the objects, object attribute table may be generated by the security device. In some example, the generated object attribute table may be selectively accessible to the security appliance.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for determining an object, comprising:
providing a security appliance, with a processor and memory, the security appliance receiving image of an object, the image of the object captured by a security device, the security device located in a first location;
receiving image of another object by the security appliance, the image of the another object captured by another security device, the another security device located in a second location;
processing by the security appliance, the image of the object received from the security device, to generate a first plurality of attributes for the object;
processing by the security appliance, the image of the another object received from the another security device, to generate a second plurality of attributes for the another object;
comparing by the security appliance, the first plurality of attributes for the object captured by the security device and the second plurality of attributes for the another object captured by the another security device and determining that the object captured by the security device and the another object captured by the security device are the same based on the comparison;
evaluating selective first plurality of attributes and selective second plurality of attributes,
wherein, the selective first plurality of attributes at least include a time of capture associated with the image of the object and a location of the first location; and
wherein, the selective second plurality of attributes at least include a time of capture associated with the image of the another object and a location of the second location; and
concluding the object moved between the first location and the second location.

2. The method of claim 1, wherein the first location and the second location are located in a defined neighborhood in a map and mapping the movement of the object in the map, from the first location to the second location.

3. The method of claim 2, wherein a plurality of other security devices are deployed at different locations within the defined neighborhood, the security appliance configured to receive images of a plurality of objects captured by each of the plurality of other security devices for analysis and based on the analysis, concluding the object moved to a third location in the defined neighborhood.

4. The method of claim 3, further including, mapping the movement of the object to the third location in the map, indicating a likely path followed by the object.

5. The method of claim 1, further including:
receiving a video chunk captured by the security device, with the image of the object embedded in the video chunk;
processing the video chunk received from the security device by the security appliance; and
selectively extracting the image of the object from the video chunk by the security appliance.

6. The method of claim 1, further including:
processing a video chunk captured by the security device; and
selectively extracting the image of the object from the video chunk by the security device.

7. The method of claim 6 further including comparing the extracted image of the object with a list of known images by the security device and classifying the extracted image of the object as an unknown object when the extracted image of the object does not match with the list of known images.

8. The method of claim 7, further including:
retrieving the extracted image of the object classified as an unknown object by the security appliance;
comparing the extracted image of the object classified as an unknown object to a list of known objects in the neighborhood; and
selectively initiating a recording by other security devices in the neighborhood when the extracted image of the object classified as an unknown object does not match with the list of known objects in the neighborhood.

9. A method for determining an object, comprising:
providing a security appliance, with a processor and memory, the security appliance receiving image of an object, the image of the object captured by a security device, the security device located in a first location;
receiving image of another object by the security appliance, the image of the another object captured by another security device, the another security device located in a second location;
processing by the security appliance, the image of the object received from the security device, to generate a first plurality of attributes for the object;
processing by the security appliance, the image of the another object received from the another security device, to generate a second plurality of attributes for the another object;
comparing by the security appliance, the first plurality of attributes for the object captured by the security device and the second plurality of attributes for the another object captured by the another security device and determining that the object captured by the security device and the another object captured by the security device are the same based on the comparison;
wherein a plurality of other security devices are deployed at different locations within a defined neighborhood, the first location and the second location are located in the defined neighborhood,
receiving images of a plurality of objects captured by each of the plurality of other security devices by the security appliance;
generating a list of objects detected by the plurality of security devices in the neighborhood; and
identifying one or more of the objects in the list as associated with the neighborhood.

10. The method of claim 9, further including:
processing a video chunk captured by the security device; and
selectively extracting the image of the object from the video chunk by the security device.

11. The method of claim 10 further including comparing the extracted image of the object with a list of known images by the security device and classifying the extracted image of the object as an unknown object when the extracted image of the object does not match with the list of known images.

12. The method of claim 11, further including:
retrieving the extracted image of the object classified as an unknown object by the security appliance;
comparing the extracted image of the object classified as an unknown object to the list of objects associated with the neighborhood; and
selectively initiating a recording by other security devices in the neighborhood when the extracted image of the object classified as an unknown object does not match with the list of objects associated with the neighborhood.

13. A system to determine an object, comprising:
a security appliance, with a processor and memory, the security appliance configured to receive image of an object, the image of the object captured by a security device, the security device located in a first location;
receive image of another object by the security appliance, the image of the another object captured by another security device, the another security device located in a second location;
process the image of the object received from the first security device, by the security appliance to generate a first plurality of attributes for the object;
process the image of the another object received from the second security device, by the security appliance to generate a second plurality of attributes for the another object compare the first plurality of attributes for the object captured by the security device and the second plurality of attributes for the another object captured by the another security device and determine that the object and the another object are the same based on the comparison by the security appliance;
evaluate selective first plurality of attributes and selective second plurality of attributes,
wherein, the selective first plurality of attributes at least include a time of capture associated with the image of the object and a location of the first location; and
wherein, the selective second plurality of attributes at least include a time of capture associated with the image of the another object and a location of the second location; and
conclude the object moved between the first location and the second location.

14. The system of claim 13, wherein the first location and the second location are located in a defined neighborhood in a map and mapping the movement of the object in the map, from the first location to the second location.

15. The system of claim 14, wherein a plurality of other security devices are deployed at different locations within the defined neighborhood, the security appliance configured to receive images of a plurality of objects captured by each of the plurality of other security devices for analysis and based on the analysis, concluding the object moved to a third location in the defined neighborhood.

16. The system of claim 15, wherein, the movement of the object to the third location is mapped, indicating a likely path followed by the object.

17. The system of claim 13, further including:
a video chunk captured by the security device is received by the security appliance, with the image of the object embedded in the video chunk;
the video chunk received from the security device is processed by the security appliance; and
the image of the object is selectively extracted from the video chunk by the security appliance.

18. The system of claim 13, further including:
a video chunk captured by the security device is processed by the security device; and
the image of the object is selectively extracted from the video chunk by the security device.

19. The system of claim 18 further including,
the extracted image of the object is compared with a list of known images by the security device; and
the extracted image of the object is classified as an unknown object when the extracted image of the object does not match with the list of known images.

20. The system of claim 19, further including:
the extracted image of the object classified as an unknown object is retrieved by the security appliance;
the extracted image of the object classified as an unknown object is compared to a list of known objects in the neighborhood; and
selectively initiate a recording by other security devices in the neighborhood when the extracted image of the object classified as an unknown object does not match with the list of known objects in the neighborhood.

21. A system to determine an object, comprising:
a security appliance, with a processor and memory, the security appliance configured to receive image of an object, the image of the object captured by a security device, the security device located in a first location;
receive image of another object by the security appliance, the image of the another object captured by another security device, the another security device located in a second location;
process the image of the object received from the first security device, by the security appliance to generate a first plurality of attributes for the object;
process the image of the another object received from the second security device, by the security appliance to generate a second plurality of attributes for the another object;
compare the first plurality of attributes for the object captured by the security device and the second plurality of attributes for the another object captured by the another security device and determine that the object and the another object are the same based on the comparison by the security appliance;
wherein a plurality of other security devices are deployed at different locations within a defined neighborhood, the first location and the second location are located in the defined neighborhood,
images of a plurality of objects captured by each of the plurality of other security devices are received by the security appliance;
a list of objects detected in the neighborhood is generated by the security appliance; and
one or more of the objects in the list are identified as associated with the neighborhood.

22. The system of claim 21, further including:
a video chunk captured by the security device is processed by the security device; and
the image of the object is selectively extracted from the video chunk by the security device.

23. The system of claim 21, further including,
the extracted image of the object is compared with a list of known images by the security device; and
the extracted image of the object is classified as an unknown object when the extracted image of the object does not match with the list of known images.

24. The system of claim 23, further including:
the extracted image of the object classified as an unknown object is retrieved by the security appliance;
the extracted image of the object classified as an unknown object is compared to the list of objects associated with the neighborhood; and
selectively initiate a recording by other security devices in the neighborhood when the extracted image of the object classified as an unknown object does not match with the list of objects associated with the neighborhood.

* * * * *